US009363148B2

(12) United States Patent
Somaiya et al.

(10) Patent No.: US 9,363,148 B2
(45) Date of Patent: Jun. 7, 2016

(54) GRAPHICAL USER INTERFACE FOR DISPLAYING INFORMATION RELATED TO A VIRTUAL MACHINE NETWORK

(71) Applicant: VMware, Inc., Palo Alto, CA (US)

(72) Inventors: Manasvi Somaiya, Mountain View, CA (US); Steve Liu, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 14/179,479

(22) Filed: Feb. 12, 2014

(65) Prior Publication Data

US 2015/0229532 A1 Aug. 13, 2015

(51) Int. Cl.
| G06F 15/177 | (2006.01) |
| H04L 12/24 | (2006.01) |
| H04L 29/08 | (2006.01) |
| H04L 12/26 | (2006.01) |
| G06F 9/455 | (2006.01) |

(52) U.S. Cl.
CPC ............ *H04L 41/22* (2013.01); *G06F 9/45558* (2013.01); *H04L 43/0823* (2013.01); *H04L 67/10* (2013.01); *G06F 2009/45591* (2013.01)

(58) Field of Classification Search
CPC ...................................................... H04L 41/22
See application file for complete search history.

(56) References Cited

U.S. PATENT DOCUMENTS

| 6,727,926 | B1 | 4/2004 | Utsuki et al. |
| 8,032,621 | B1 | 10/2011 | Upalekar et al. |
| 9,043,717 | B2 | 5/2015 | Noel et al. |
| 2005/0219151 | A1 | 10/2005 | Li et al. |
| 2009/0237404 | A1* | 9/2009 | Cannon, III ........... G06T 11/206 345/440 |
| 2010/0318931 | A1* | 12/2010 | Boykin .................. G06F 3/0482 715/771 |
| 2011/0225582 | A1 | 9/2011 | Iikura et al. |
| 2011/0283278 | A1 | 11/2011 | Murrell et al. |
| 2012/0042284 | A1* | 2/2012 | Liesche ............. G06F 17/30994 715/834 |
| 2012/0166623 | A1 | 6/2012 | Suit |
| 2012/0166624 | A1 | 6/2012 | Suit |
| 2012/0216135 | A1* | 8/2012 | Wong .................. G06F 9/45533 715/764 |
| 2012/0284628 | A1 | 11/2012 | Wong et al. |
| 2012/0311475 | A1 | 12/2012 | Wong |
| 2013/0050246 | A1* | 2/2013 | Barry ...................... G06F 11/32 345/593 |
| 2013/0055155 | A1* | 2/2013 | Wong ........................ G06F 8/65 715/810 |
| 2013/0239111 | A1* | 9/2013 | Bingham ............ G06F 9/45533 718/1 |
| 2013/0262347 | A1 | 10/2013 | Dodson |
| 2014/0122941 | A1* | 5/2014 | Pan ........................ G06F 11/328 714/45 |
| 2015/0040017 | A1* | 2/2015 | Roche ..................... G06F 11/32 715/736 |

\* cited by examiner

*Primary Examiner* — Omar Abdul-Ali

(57) ABSTRACT

A graphical user interface for displaying information related to a virtual machine network is disclosed. In an embodiment, a non-transitory computer-readable storage medium stores instructions that, when executed by a computer, enable a graphical user interface to be displayed. The graphical user interface, which assists in graphical representation of log data entries in a virtual machine network, includes a circular element that is divided into slices and virtual machine indicator elements that represent virtual machines within each slice. The slices represent various groupings of the virtual machines within the virtual machine network.

21 Claims, 8 Drawing Sheets

GRAPHICAL USER INTERFACE FOR DISPLAYING INFORMATION RELATED TO A VIRTUAL MACHINE NETWORK

BACKGROUND

A complex virtual machine network may include several clusters of individual host computers (hosts) with each host supporting hundreds of virtual machines (VMs). In order to keep track of the functionality of each object, such as VMs and hosts, in the VM network, various events and activities in the VM network are recorded in log files. Log files are typically stored as simple text in a single file which can then be filtered and/or searched to understand the cause of a problem. The log files can be created in many forms including, for example, event logs or message logs and in many different ways. For example, when a new VM or host is added to the VM network or VMs are migrated to a new host, event logs may be generated and written to a log file by an application running on the object or by a subsystem that is part of each object.

If a problem arises in the VM network, a system administrator can review entries in the log files to determine the root cause of the problem. For example, if VMs are found to be inaccessible, then a system administrator might review the log files and determine that the corresponding host is nonresponsive. However, a complex VM network can generate a large volume of log data entries for review (e.g., hundreds of gigabytes of log files in just a few minutes). To reduce the size of log files, codes or abbreviations are used for data entries rather than spelling out the full details in each entry. For example, log data entries often include representative codes that correspond to more complete error messages in a file that is separate from the log file. When reviewing log files using representative codes to find the cause of a problem, it can be difficult to understand the contents of a log file without first translating the log file. Translating an entire log file can be extremely time consuming or practically impossible and important information can be missed if less than the entire log file is translated.

To simplify the review process, log data entries in a log file are often graphically displayed and filtered based on some metric. Typically, the filtering of log data entries is limited to log data entry types (e.g., vxpol, vmkernel, or shell) or the time the log data entry was made. However, filtering cannot always be used to limit the displayed log data entries to just the entries related to the problem. Often, when reviewing log data entries, system administrators must rely on experience and creativity, which can make finding the root cause of the problem very difficult, particularly if there are multiple contributing factors. Thus, there is a need for a way to manage log file data related to complex VM networks in an efficient manner that does not rely so heavily on the experience and creativity of a system administrator to find related log data entries and to determine the root cause of a problem.

SUMMARY

In an embodiment, a non-transitory computer-readable storage medium stores instructions that, when executed by a computer, enable a graphical user interface to be displayed. The graphical user interface, which assists in graphical representation of log data entries in a virtual machine network, includes a circular element that is divided into slices and virtual machine indicator elements that represent virtual machines within each slice. The slices represent various groupings of the virtual machines within the virtual machine network.

In another embodiment, a computer-implemented method for displaying information related to a virtual machine network is disclosed. The method involves, displaying a circular element on a display device, the circular element being divided into slices and displaying virtual machine indicator elements within the slices, the virtual machine indicator elements representing virtual machines, with the slices representing groupings of virtual machines within the virtual machine network.

In another embodiment, a computer-implemented system for displaying a graphical user interface, which displays information related to a virtual machine network, is disclosed. The graphical user interface includes a circular element divided into slices and virtual machine indicator elements located within the slices, the virtual machine indicator elements representing virtual machines. The slices represent groupings of virtual machines within the virtual machine network.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. Merely as an example, aspects that will be described as being applied to a virtual machine network can be similarly applied in the display of information regarding physical computers/machines. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
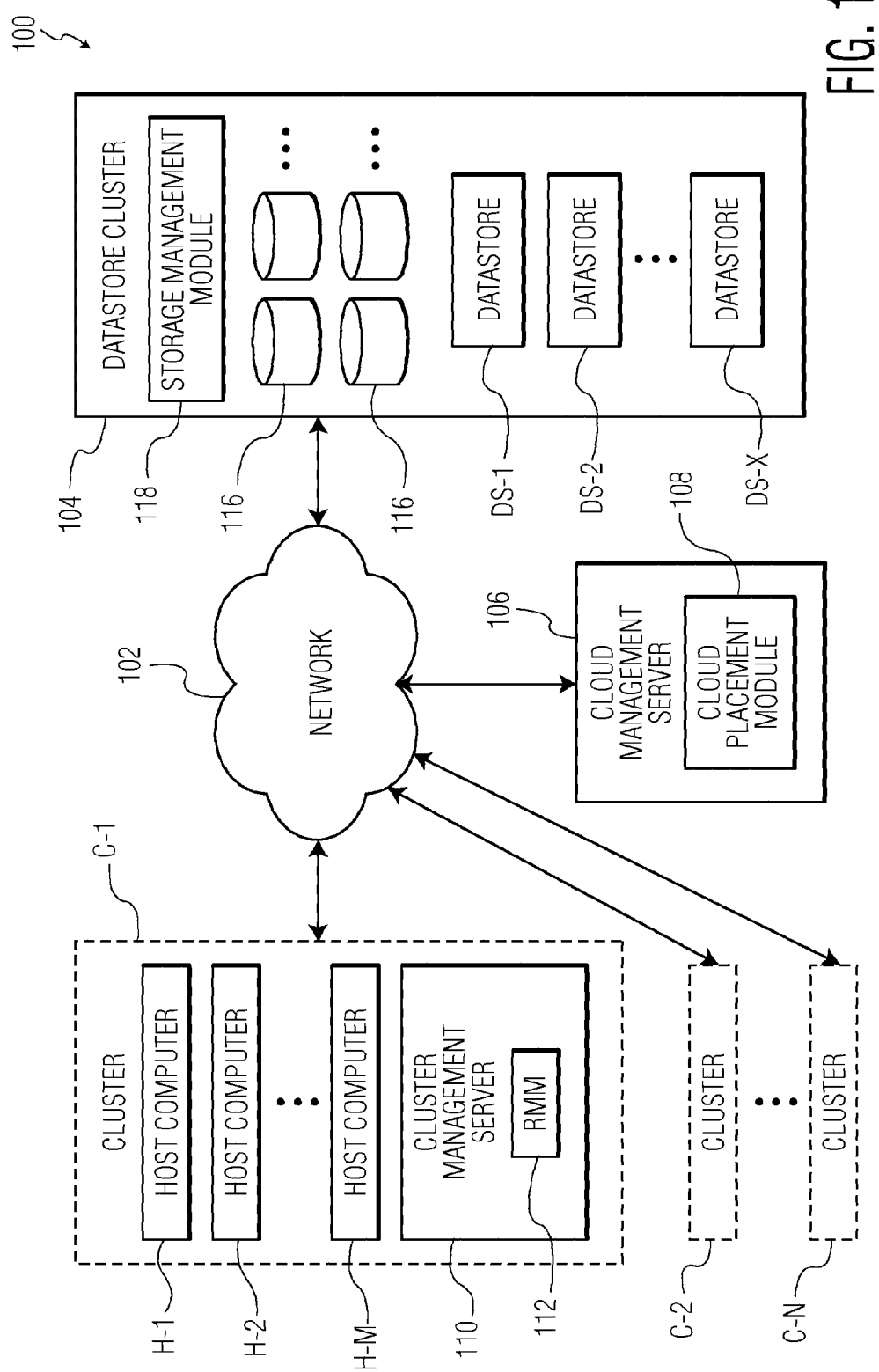
FIG. 1 is a block diagram of a distributed computer system.

Turning now to FIG. 1, a distributed computer system 100 is shown. The distributed computer system, referred to as a "virtual machine network," includes a network 102, clusters C-1, C-2 . . . C-N (where N is a positive integer) of host computers, and a datastore cluster 104. The exact number of host computer clusters included in the distributed computer system can be, for example, from a few clusters to tens of clusters or more. The host computers of the different clusters and the datastore cluster are connected to the network. Thus, each of the host computers in the clusters is able to access the datastore cluster via the network and may share the resources provided by the datastore cluster with the other host computers. Consequently, any process running on any of the host computers may also access the datastore cluster via the network.

In the illustrated embodiment, each of the clusters C-1, C-2 . . . C-N includes a number of host computers H-1, H-2 . . . H-M (where M is a positive integer) and a cluster management server 110 with a resource management module (RMM) 112. The number of host computers included in each of the clusters can be any number from, for example, one to several hundred or more. In addition, the number of host computers included in each of the clusters can vary so that different clusters can have a different number of host computers. While at least some of the host computers may be virtualized, in the embodiment of FIG. 1, the host computers are physical computer systems that host or support one or more VMs so that the VMs are executing on the physical computer systems. The host computers may be servers that are commonly found in data centers. As an example, the host computers may be servers installed in one or more server racks. Typically, the host computers of a cluster are located within the same server rack.

Each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the VMs running on the host computers, for example, virtual machines (VMs), in the respective cluster. The monitored configurations may include the hardware configuration of each of the host computers, such as CPU type and memory size, and/or software configurations of each of the host computers, such as operating system (OS) type and installed applications or software programs. The monitored configurations may also include VM hosting information, i.e., which VMs are hosted and running on which host computers. The monitored configurations may also include VM information. The VM information may include the size of each of the VMs, virtualized hardware configurations for each of the VMs, such as virtual CPU type and virtual memory size, software configurations for each of the VMs, such as OS type and installed applications or software programs running on each of the VMs, and virtual storage size for each of the VMs. The VM information may also include resource parameter settings, such as demand, limit, reservation and share values for various resources, e.g., CPU, memory, network bandwidth and storage, which are consumed by the VMs. The demands of the VMs for the consumable resources are determined by the host computers hosting the VMs by monitoring the current usage of resources by the VMs, e.g., CPU processing usage, memory usage, network usage and/or storage usage, and provided to the respective cluster management server.

The cluster management servers 110 may also perform various operations to manage the VMs and the host computers H-1, H-2 . . . H-M in their respective clusters. As illustrated in FIG. 1, each cluster management server includes the resource management module (RMM) 112, which can be enabled by a user, to perform resource allocations and load balancing in the respective cluster. The resource management module operates to allocate available resources among VMs running in the cluster based on a number of parameters, which may include predefined rules and priorities. The resource management module may be configured to select an appropriate host computer in the cluster when a new VM is added to the cluster, to assign applications running on VMs to an appropriate datastore, and to power down particular VMs and/or host computers in the cluster to conserve power. Additionally or alternatively, the RMM may be programmed to perform other operations to manage the cluster.

In some embodiments, the cluster management servers 110 may be implemented on separate physical computers. In other embodiments, the cluster management servers may be implemented as software programs running on a host computer or a virtual computer. In an implementation, the cluster management servers are VMware vCenter™ servers with at least some of the features available for such servers and each resource management module 112 is a VMware Distributed Resource Scheduler™, which provides a Distributed Resource Scheduler (DRS) service as is known in the field.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE), and HyperSCSI.

The datastore cluster 104 is used to store data for the host computers of the clusters C-1, C-2 ... C-N, which can be accessed like any other type of storage device commonly connected to computer systems. In an embodiment, the datastore cluster can be accessed by entities, such as VMs running on the host computers, using any file system, e.g., virtual machine file system (VMFS) or network file system (NFS). The datastore cluster includes one or more computer data storage devices 116, which can be any type of storage devices such as hard disks, solid-state devices (SSDs), or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the managing module is a computer program executing on one or more computer systems (not shown) of the datastore cluster. The datastore cluster supports multiple virtualized representations of storage facilities, referred to as datastores DS-1, DS-2 ... DS-X (where X is a positive integer), which may be identified using logical unit numbers (LUNs). Thus, each datastore may use resources from more than one storage device included in the datastore cluster. The datastores are used to store data associated with the VMs supported by the host computers of the clusters C-1, C-2 ... C-N. For virtual machines, the datastores may be used as virtual storage or virtual disks to store files needed by the virtual machines for operation. One or more datastores may be associated with one or more clusters. In an embodiment, the same datastore may be associated with more than one cluster.

Figure 2:
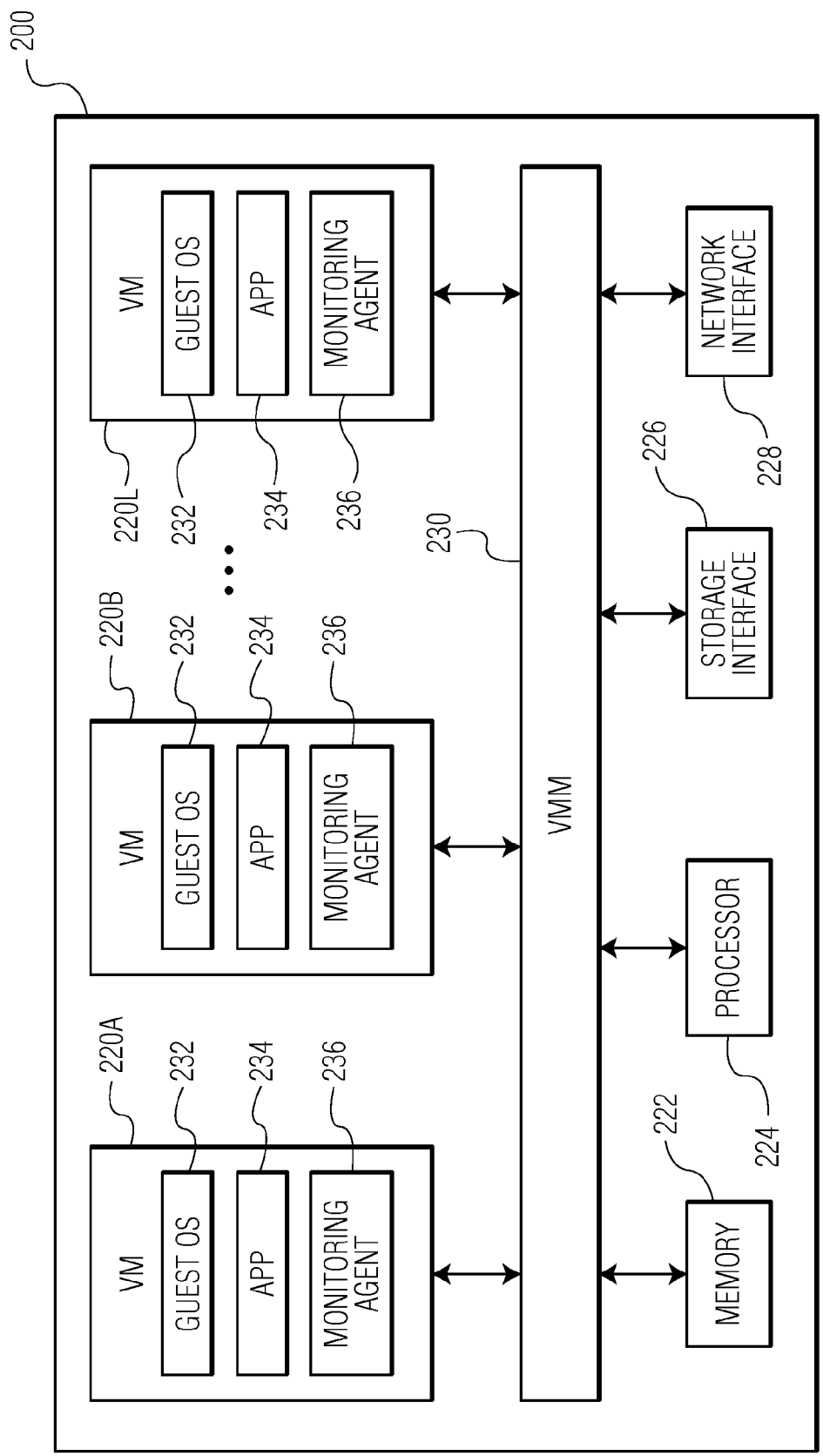
FIG. 2 is a block diagram of a host computer.

Turning now to FIG. 2, components of a host computer 200, which is representative of the host computers H-1, H-2 ... H-M, are shown. In the illustrated embodiment, the host computer is configured to support a number of VMs 220-1, 220-2 ... 220-L (where L is a positive integer). The number of VMs supported by the host computer can be anywhere from one to more than one hundred. The exact number of VMs supported by the host computer is only limited by the physical resources of the host computer. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with the datastore cluster 104 in FIG. 1. As an example, the storage interface may be a host bus adapter or a network file system interface. The network interface 228 is an interface that allows the host computer to communicate with other devices in the cluster as well as devices connected to the network 102 in FIG. 1. As an example, the network interface may be a network adapter.

In the illustrated embodiment, the VMs 220-1, 220-2 ... 220-L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM may include a guest operating system 232, one or more guest applications 234, and a monitoring agent 236. The guest operating system is a master control program of the respective VM and, among other things, the guest operating system forms a software platform on top of which the guest applications run. Guest applications are individual programs such as, for example, an email manager or a system logger. In an embodiment, the monitoring agent generates log data based on the performance of the guest operating system and guest applications.

Similar to any other computer system connected to the network 102 in FIG. 1, the VMs 220-1, 220-2 ... 220-L shown in FIG. 2 are able to communicate with other computer systems connected to the network using the network interface 228 of the host computer 200. In addition, the VMs are able to access the datastore cluster 104 (FIG. 1) using the storage interface 226 (FIG. 2) of the host computer.

Referring to FIG. 1, to facilitate maintenance of the VM network, various events and activities within the network are recorded in log files that can be stored on a Cloud Management Server 106. In an embodiment, the Cloud Management Server is configured to monitor and generate configurations for entities (e.g., clusters, hosts, VMs, datastores, etc.) within a VM network to maintain functionality of the VM network. Typically, entities within a VM network can communicate with the Cloud Management Server and, thus, each host, datastore, or other entity of the VM network can write log data entries to a log file stored on the Cloud Management Server. Alternatively, log data entries related to an entity can be generated by the Cloud Management Server based on information or lack thereof received from the entity. For example, if a new VM is added to host H-1, host H-1 will write a log data entry to its corresponding log file recording the event or the Cloud Management Server will generate a log data entry to a log file upon receiving the first communication from the new VM. As is known in the field, log data entries can be reviewed to determine if the VM network is experiencing a problem and to determine the root cause of the problem.

Because many events and activities occur within a VM network, codes or abbreviations are often used to reduce the size of each log data entry and, thereby, reduce the overall size of the corresponding log file. One drawback to using code or abbreviations in a log file is that the entries in a log file are less informative without translation and so the log data entries must be translated before much useful information can be gleaned from a log file. For example, a log data entry may recite "network connection error 118," which corresponds to an entry in a separate file that provides more information about the cause of the network connection error.

Typically, only a portion of log data entries in a log file will be selected to be translated based on the experience and creativity of a system administrator. The selection of log data entries is typically referred to as the scope. The scope can typically be defined by, for example, limiting the error types found in the log data entry, requiring a minimum number of occurrences of similar log data entries before inclusion, or defining a range over which log data entries are considered to include certain events. While system administrators are trained to resolve system problems, it remains very difficult to learn which log data entries to include in the scope and which log data entries to translate in order to manage a VM network. To simplify managing a VM network, log data entries in a log file may be graphically represented to enable quick understanding of some aspect of the VM network.

In an embodiment, a graphical user interface for representing information related to a VM network includes a circular element that is divided into slices that represent groupings of VMs and virtual machine indicator elements that are located within each slice to represent VMs that are in the corresponding groupings. In an embodiment, the slices represent hosts and, in another embodiment, adjacent host slices are grouped to represent a cluster. Graphically displaying VM network information by dividing a circular element into host-based slices and including virtual machine indicator elements in the corresponding slices provides for a quick and easy way to graphically represent the configuration of a VM network in terms of the number of clusters, the number of hosts, and the distribution of VMs amongst the clusters and hosts.

In a further embodiment, elements in the radial map are color-coded based on the log data entries to represent the state of the corresponding entities in the VM network. For example, a color-coding scheme of white through shades of red can be used to represent a good state (white) to various degrees of a bad state (dark red). The color-coding scheme can be applied to a portion of each slice to represent the state of a corresponding host and to each virtual machine indicator element to represent the state of corresponding VMs. In an embodiment, the state of the elements, and thus the color-coding, is determined based on log data entries in at least one log file. For example, the virtual machine indicator element corresponding to a VM that is unable to connect to the network, thereby causing a log data entry with the code "network connection error 118" to be generated by the Cloud Management Server, can be color-coded red to indicate that the corresponding VM is in a bad state without having to read or translate the log data entry. Color-coding the slices and virtual machine indicator elements in slice-based groupings provides a quick and easy way to graphically represent the configuration and state of the corresponding hosts and VMs without having to read and translate individual log data entries.

Figure 3:
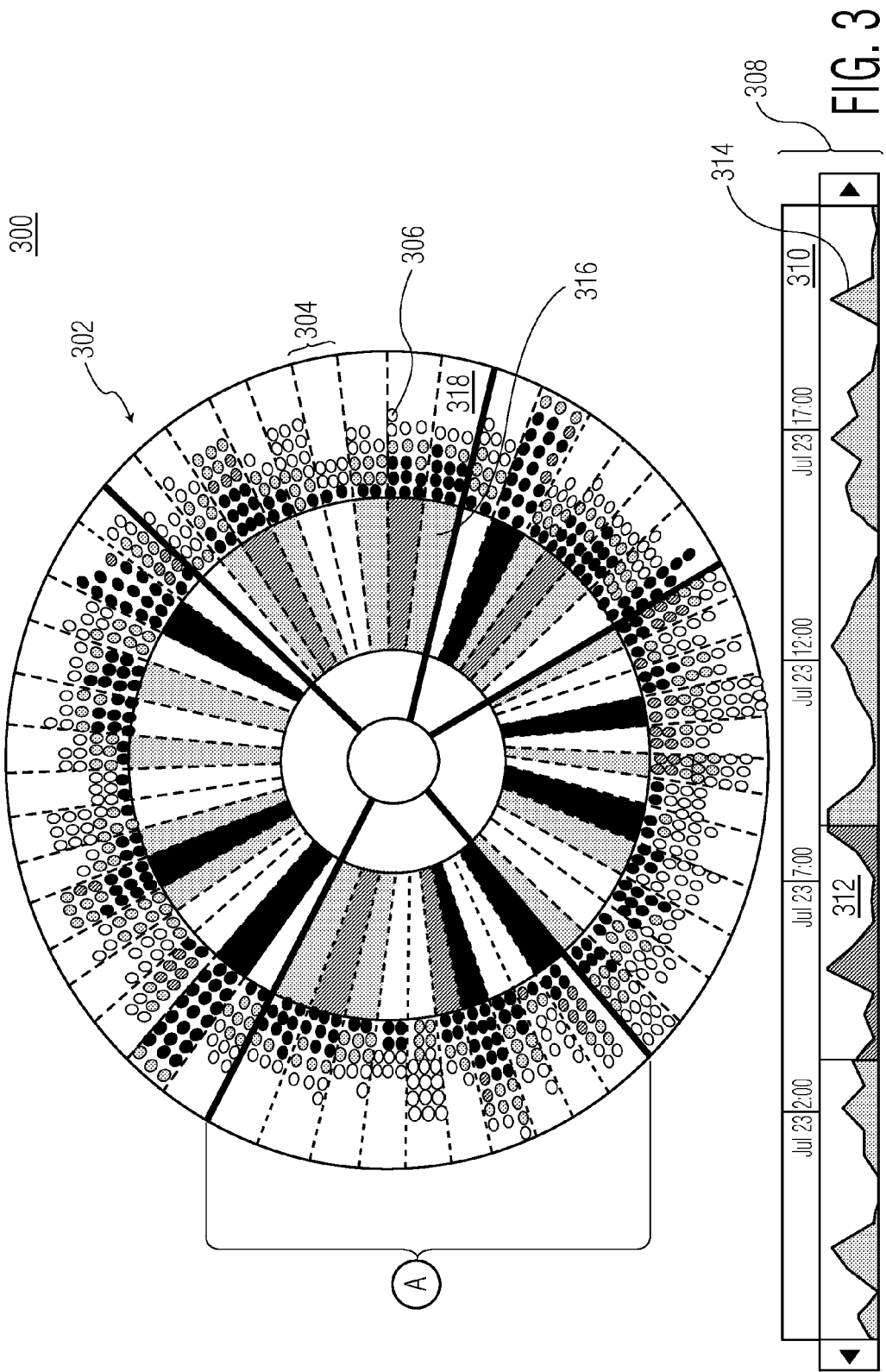
FIG. 3 is an embodiment of a graphical user interface for representation of log data entries in accordance with an embodiment of the invention.

FIG. 3 depicts an example of a graphical user interface 300 that displays information related to a VM network in accordance with an embodiment of the invention. As shown in FIG. 3, the graphic user interface has a circular element 302 divided into slices 304 that correspond to hosts in the VM network and each slice includes virtual machine indicator elements 306 that correspond to VMs running on the corresponding host. As shown, the graphic user interface forms a "radial map" of a virtual machine network. In an embodiment, a slice is a sector of circle or an area of a circle defined by two radial lines extending from the center of the circle out towards the perimeter. Examples of a slice include a portion of a circle resembling a "slice" of a pie or pizza or any shape that is defined by two radii of a circle and an arc between the two radii.

Each slice 304 in the radial map of FIG. 3 includes an inner portion 316 and an outer portion 318 that are used to graphically represent some characteristic, parameter, or aspect of the host. In the embodiment of FIG. 3, the outer portion of a slice is used to house the VM indicator elements 306 (which correspond to the VMs running on the host) and the inner portion of the slices is used to graphically represent the overall state of the host. In an embodiment, the state of each host is indicated by color-coding the inner portion of the slice and the state of each VM running on the host is indicated by color-coding the virtual machine indicator elements in the outer portion of the slice.

In the embodiment of FIG. 3, the color-coding is illustrated using shades of gray, but could be shades of another color (e.g., shades of red) or multiple different colors (e.g., a spectrum of colors including red, orange, yellow, green, etc.). Other schemes for visually indicating the state of an entity could be used as well.

In addition to using the inner portion 316 and the outer portion 318 of a slice 304 to graphically represent the VM network, multiple slices can be grouped so that slices corresponding to hosts in the same cluster are adjacent to each other around the circular element 302. For example, in FIG. 3, the hosts included within bracket A are all adjacent to each other to graphically represent that the hosts are on the same cluster. In an embodiment, each cluster is delineated by dark radial lines dividing the slices in a cluster from the rest of the slices in the circular element.

In an embodiment, the graphic user interface 300 also includes a time-frame window 308, as shown in FIG. 3, which corresponds to a temporal aspect of the scope of log data entries graphically represented by the radial map. In the embodiment of FIG. 3, the time-frame window has a timeline 310 corresponding to a period of time over which log data entries were generated, a frame 312 focused around a part of the timeline to indicate the time period over which log data entries that are graphically represented were generated, and a baseline indicator 314 that indicates baseline performance of the VM network over the period of time. The frame can be slid along the timeline, expanded, or narrowed to select the time range of log data entries that are graphically displayed in the circular element. In an embodiment, the time range is defined by a left boundary and a right boundary, both of which can be moved independent of each other. Thus, the time-frame window provides a quick and easy way to change the time frame of the range that at least partially defines the scope of log data entries that are graphically displayed or visualized in the radial map.

Figure 4:
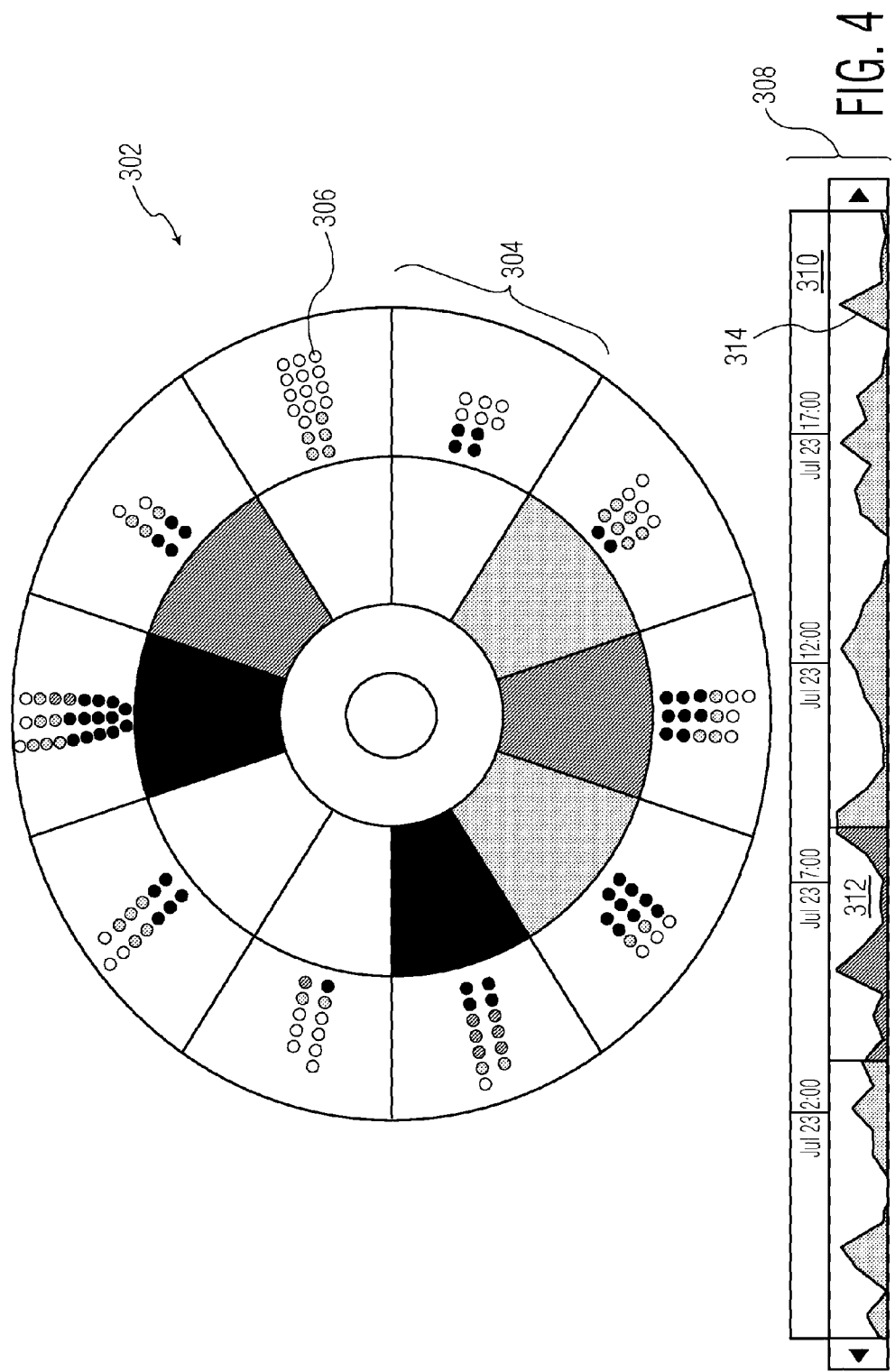
FIG. 4 is an embodiment of the graphical user interface of FIG. 4 after the scope of log data entries has been narrowed to log data entries relating to a selected cluster in accordance with an embodiment of the invention.

In an embodiment, the graphic user interface 300 also provides for graphical representation of only a single cluster in the VM network by, for example, clicking within the circular element 302 or selecting the desired cluster from a dropdown menu to narrow the scope of log data entries to those related to the selected cluster. FIG. 4 illustrates an embodiment of the graphic user interface in which the scope of the log data entries displayed has been narrowed to log data entries related to a single cluster. As shown in FIG. 4, circular element 302 is divided into slices 304 that correspond to hosts in the selected cluster and virtual machine indicator elements 306 in the slices represent VMs running on the corresponding host. Each slice in FIG. 4 has an inner portion and an outer portion similar to the slices shown in FIG. 3. The color-coding of the inner portion of each slice corresponds to the state of the corresponding host based on log data entries and the color-coding of the virtual machine indicator elements that populate the outer portion of each slice indicates the state of the corresponding VMs running on the host based on log data entries.

FIG. 4 also illustrates a time-frame 308, which has a timeline 310 corresponding to the period of time over which log data entries were generated, a frame 312 focused around a part of the timeline to indicate a period of time over which log data entries that are graphically represented were generated, and a baseline indicator 314 that indicates baseline performance of the VM network over the period of time. The frame can be slid along the timeline, expanded, or narrowed to select the time range of log data entries that are graphically displayed in the circular element. In the embodiment of FIG. 4, the range is defined by a left boundary and a right boundary, both of which can be moved independent of each other. Thus, as shown in FIGS. 3 and 4, the configuration of the entire VM network, the states of the hosts, the states of the VMs, and the correspondence between the states of hosts and the states of the VMs running on the hosts can be graphically displayed by a radial map.

Figure 5:
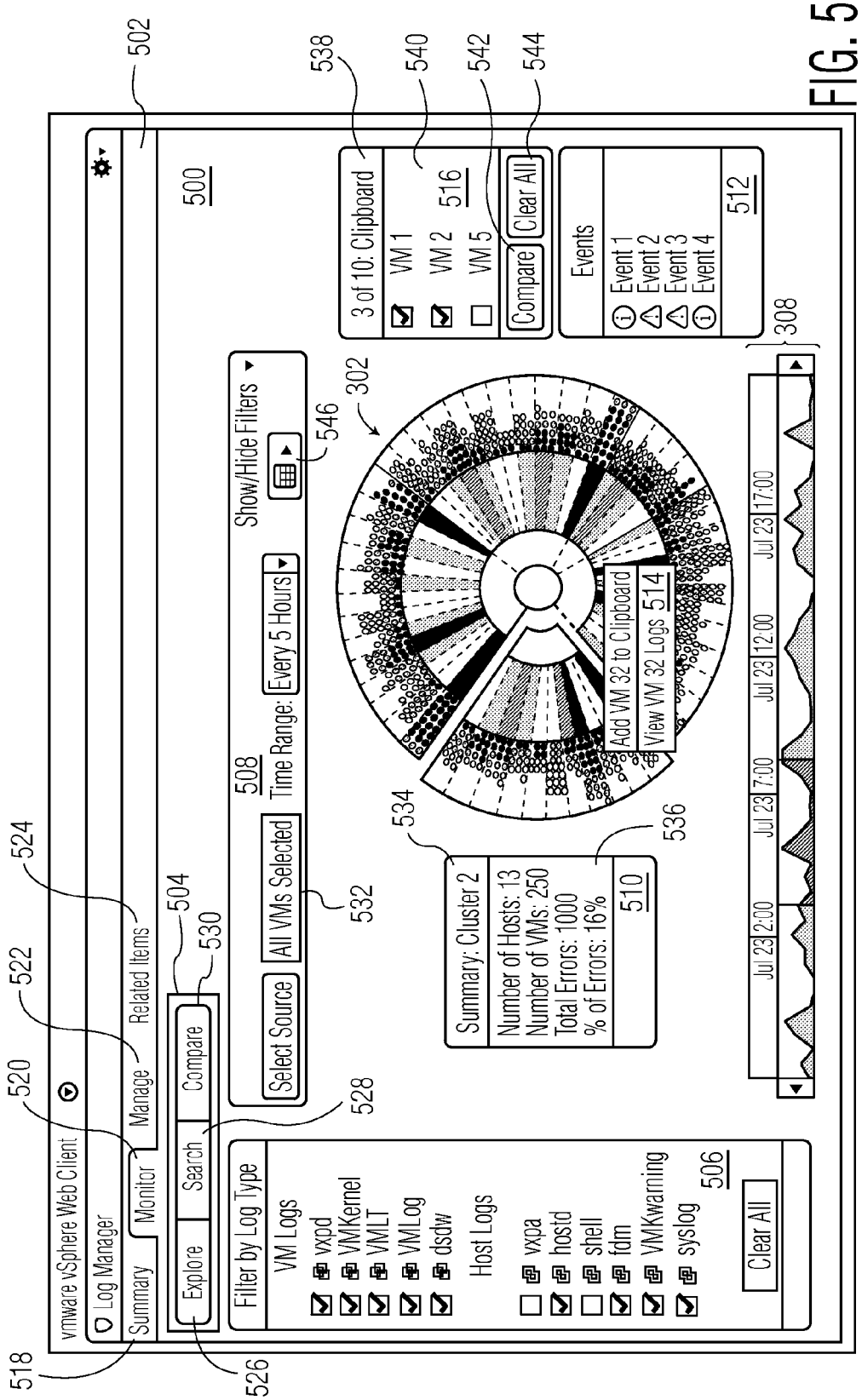
FIG. 5 is an embodiment of a graphical user interface in accordance with an embodiment of the invention.

In addition to the elements described above with reference to FIGS. 3 and 4, the graphic user interface may include other elements that graphically depict additional information about entities in the VM network and enable quick and easy definition of the scope that is graphically depicted. For example, FIG. 5 depicts an embodiment of a graphic user interface that includes the elements of FIG. 3 along with view tabs 502, function tabs 504, a filter window 506, a source-selection window 508, a summary window 510, an events window 512, a pop-up menu 514, and a clipboard window 516. The various tabs and windows as well as the menu shown in FIG. 5 together with the radial map form a "radial map view" 500. As is described in more detail below, the various tabs, windows, and menus are used to control the information that is displayed in the radial map. The view tabs include a summary tab 518, a monitor tab 520, a manage tab 522, and a related items tab 524 and can be used to select different views of information relating to the log files. In FIG. 5, the monitor view tab is selected. The monitor view tab displays information related to entries in the log file as shown in FIGS. 3-5. In addition to the view tab, the display of information can be further controlled by the function tabs, which include an explore tab 526, a search tab 528, and a compare tab 530. The explore tab allows, for example, a user that is aware of a problem, such as a performance issue or system failure, to review log files in order to find the root cause of the problem. The search tab allows, for example, a user that is both aware of a problem and knows what to look for, to look deeper into specific parts of the log file in order to find the root cause of the problem. The compare tab allows, for example, a user that has found all the information relating to a problem, to compare an object functioning normally with one that is not functioning normally to identify differences or to compare several objects experiencing similar problems for trends.

When the monitor tab 520 and the explore tab 526 are selected, a view similar to that shown in FIG. 5 is displayed. The view initially displays the filter window 506, the source-selection window 508, the summary window 510, the events window 512, and the clipboard window 516. The filter window can be used to select the logs that will be graphically represented. As shown in FIG. 5, the filter window is populated with various types of logs generated by VMs and hosts within the VM network and the scope of log data entries that are graphically represented in the other elements of the radial view map depends on which logs are selected. The log types depicted in FIG. 5 include VM log types such as a virtual provision X daemon log (vxpd), a VM kernel log (VMKernel), a VMLT, a VMLog, and a dsdw log and host log types such as a virtual provisioning X agent log (vxpa), a hostd log, a shell log, a fault domain manager log (fdm), a VM kernel warning log (VMKwarning), and a system log (syslog). If the logs are selected as shown in FIG. 5, then hosts that generate vxpd, VMKernel, VMLT, VMLog, dsdw, hostd, fdm, VMKwarning, or syslog type log data entries will be graphically represented with the circular element in the radial map view.

In the embodiment of FIG. 5, the source-selection window 508 includes a dropdown list 532 populated with various selection schema options (e.g., all VMs, all VMs in Host 1, all VMs in cluster 1), which allow the user to further define the scope of log data entries graphically represented in the radial map view. For example, the scope of log data entries received can be narrowed to certain hosts or VMs instead of all VMs and all hosts in the VM network by selecting a particular schema option in the source-selection window. As discussed above with reference to FIG. 3, the scope of log data entries can be further defined by the time frame selected on the timeline 308. Once the scope of log data entries to be graphically represented has been set by selecting the types of logs, selecting the sources of the logs, and selecting the time frame over which the log data entries were written, the circular element 302, the events window 512, and the summary window 510 populate with information related to the VMs and hosts for which log data entries are received.

In the embodiment of FIG. 5, the summary window 510 is a text box with a title field 534 and an information field 536. The title field enables the identifier of a selected entity to be displayed and the information field enables information related to the selected entity to be displayed. In an embodiment, if a cluster is selected, the title field contains the identifier for the selected cluster and the information field includes several fields indicating information about the selected cluster, such as the number of unique hosts and VMs that wrote to a log file in the defined scope, the number of errors recorded by the log data entries for the hosts and VMs, and the percent of log data entries recording errors. A low percentage of error tends to indicate that a VM network is working properly while a high percentage of error tends to indicate that a VM network is not working properly. In the embodiment of FIG. 5, the summary window is a text box located to the left side of the circular element and is divided into a title field and an information field. The text field displays "Summary: Cluster 2 " to indicate that information in the information field is related to Cluster 2 . The information field has four fields: number of hosts, number of VMs, total errors, and percent of errors. The fields are populated to indicate that 13 different hosts and 250 different VMs generated 1,000 log data entries reporting an error, with the 1,000 log data entries representing 16% of the total number of log data entries generated.

In the embodiment of FIG. 5, the events window 511 is a labeled text box populated with multiple entries indicating various events or activities that occurred in the VM network. In an embodiment, events and activities can include system events such as an entity shutting down or experiencing a system crash and can also include management events such as a new host being added to the VM network or the relocation of several VMs from one host to another. Each entry is accompanied by a symbol that indicates the impact of the event or activity on the health of the VM network. The display of events and activities enables a user to quickly determine the required size of the range corresponding to the defined scope by providing understanding of the context in which the log data entries were recorded. For example, in FIG. 5, the events window is populated with four entries corresponding to events that occurred within the defined scope. The four entries include two low impact events and two high impact events with the low impact events indicated by a lower case "i" inscribed in a circle and the high impact events indicated by an exclamation "!" inscribed in a triangle. From the entries in the events window, a user can determine if the range is sufficiently broad or narrow to include enough log data entries related to the root cause of a problem.

In addition to the elements discussed above, the radial map view 500 shown in FIG. 5 also includes a pop-up menu 514, which is activated by performing a secondary click (e.g., right-clicking) on an entity in the circular element, and a clipboard 516. The pop-up menu enables a user to view logs generated by the entity clicked or to add the entity to the clipboard. As illustrated in FIG. 5, VM 32 has been right-clicked on and a pop-up menu is displayed over the circle element with an option to add VM 32 to a clipboard or to view the logs generated by VM 32. Selecting the option to add VM 32 to a clipboard will add VM 32 to the clipboard.

In the embodiment of FIG. 5, the clipboard 516 is a text box that indicates a number of VMs from which VMs can be further selected for comparison. A first part 538 of the clipboard enables the user to graphically determine how many entities out of a maximum number of possible entities have been added to the clipboard, a second part 540 of the clipboard graphically displays the entities that have been added to the clipboard along with a checkbox to indicate if the entity has been selected, and a third part of the clipboard has a "compare" button 542 and a "clear all" button 544, which enable a user to display similar information related to all selected entities in the clipboard or to deselect all selected entities in the clipboard respectively. As shown in FIG. 5, the first part of the clipboard displays that a maximum of 10 entities can be added to the clipboard, of which three have already been added. The second part of the clipboard displays VM1, VM2, and VM5 as the three entities that have already been added to the clipboard and also indicates that VM1 and VM2 are selected. In an embodiment, clicking on the "compare" button in the third part displays similar information related to VM1 and VM2 in a new window and clicking on the "clear all" button deselects both VM1 and VM2.

In addition to graphically representing log data entries in a radial map view, log data entries can be graphically represented in a chart format, also referred to as a "heat map", by activating a heat map view. In the embodiment of FIG. 5, a heat map view can be activating by clicking on a view selection button 546 provided for selecting the radial map view or the heat map view.

Figure 6:
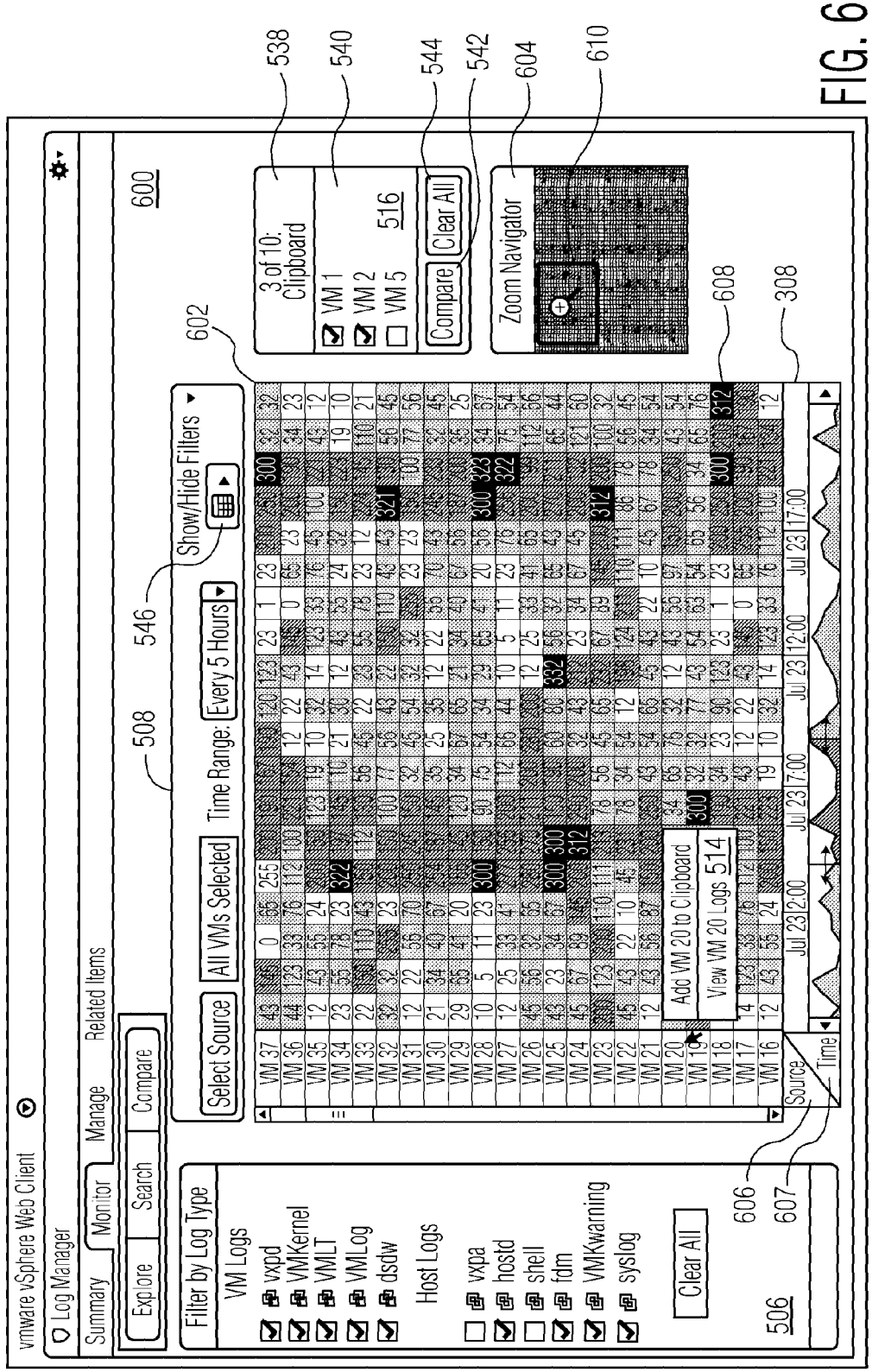
FIG. 6 is an embodiment of a graphical user interface in accordance with the invention.

FIG. 6 depicts an embodiment of a graphical user interface in a heat map view 600, which indicates the state of VMs in a VM network based on log data entries by using error indicators arranged in columns and rows. The heat map view includes a heat map chart 602, a time-frame window 308, a filter window 506, a pop-up menu 514, a clipboard 516, and a zoom navigator window 604. The heat map chart is a chart with one or more rows 606 and one or more columns 607. In an embodiment, the rows correspond to an entity and can be ordered, for example, numerically and/or by placing entities in a grouping adjacent to each other and the columns correspond to a time. In various embodiments, the time could be, for example, a specific time (e.g., at exactly 2:00 pm), a period of time (e.g., the hour of time beginning at 2:00 pm or on June 1), or a range of time (e.g., the range of time between 2:00 pm and 7:00 pm). In the embodiment of FIG. 6, the rows are labeled at the beginning of each row with entities within the VM network and are ordered numerically and the columns correspond to equal periods of time over the five hours between 3 and 8 PM, but are unlabeled. In an alternative embodiment, the columns are labeled and correspond to times on a timeline located at the bottom of the heat map.

An error indicator 608 is located at the intersection of the row corresponding to the entity with the column corresponding to a time to indicate the state of the entity at the time by displaying a value equal to the number of log data entries reporting an error that were generated at the time and by color-coding to indicate the state of the entity. In the embodiment of FIG. 6, the color-coding uses shades of gray, however the color-coding can be shades of another color (e.g., shades of red) or multiple different colors (e.g., a spectrum of colors including red, orange, yellow, green, etc.). Other schemes for visually indicating the state of the entity could be used as well. In the graphic user interface illustrated in FIG. 6, over the last time period included in the chart, VM 18 generated 312 log data entries as indicated by the error indicator located at the intersection of the row corresponding to VM 18 and the last time period with respect to FIGS. 3-5.

Similar to the radial map view 500 discussed above, the heat map view 600 has a time-frame window 308 that corresponds to the scope of log data entries graphically represented by the heat map. In an embodiment, the time-frame window has a timeline corresponding to a period of time over which log data entries were generated, a frame focused around a part of the timeline to indicate the period of time over which log data entries that are graphically represented were generated, and a baseline indicator that indicates baseline performance of the VM network over the period of time. The frame can be slid along the timeline, expanded, or narrowed to select the time range of log data entries that are graphically displayed in the circular element. In the embodiment of FIG. 6, the time range is defined by a left boundary and a right boundary, both of which can be moved independent of each other.

In the embodiment of FIG. 6, the filter window 506 can be used to select the logs that will be graphically represented. As shown in FIG. 6, the filter window is populated with various types of logs generated by VMs and hosts within the VM network and the scope of log data entries that are graphically represented in the other elements of the heat map view depends on which logs are selected. The log types depicted in FIG. 6 include VM log types such as a virtual provision X daemon log (vxpd), a VM kernel log (VMKernel), a VMLT, a VMLog, and a dsdw log and the host log types include a virtual provisioning X agent log (vxpa), a hostd log, a shell log, a fault domain manager log (fdm), a VM kernel warning log (VMKwarning), and a system log (syslog). If the logs are selected as shown in FIG. 6, then hosts that generate vxpd, VMKernel, VMLT, VMLog, dsdw, hostd, fdm, VMKwarning, or syslog type log data entries will be graphically represented with the heat map.

In the event that a greater number of entities or a greater range of time is selected than can be displayed on a display device at one time, a zoom navigator window 604 can be used to indicate where the error indicators displayed on the display device are located in the heat map. In the embodiment of FIG. 6, a zoom navigator window has a miniature view of the entire heat map 602 and a magnifying glass inscribed in a square frame 610 which indicates the portion and location of error indicators in the heat map being displayed on the display device. The magnifying glass and frame can be moved around in the zoom navigator window to change the portion of error indicators displayed on the display device.

In addition to the elements discussed above, the heat map view 600 shown in FIG. 6 also includes a pop-up menu 514 and a clipboard 516. The pop-up menu is activated by performing a secondary click (e.g., right-clicking) on an entity in the heat map 602 which displays a pop-up textbox menu that enables a user to view logs generated by the entity clicked on or to add the entity to the clipboard. In FIG. 6, VM 20 has been right-clicked on and a pop-up menu is displayed over the heat map with an option to add VM 20 to a clipboard or to view logs generated by VM 20. Selecting the option to add VM 20 to a clipboard will add VM 20 to the clipboard. After a subsequent click, the pop-up menu is no longer displayed.

In the embodiment of FIG. 6, the clipboard 516 is a text box that indicates a number of selected VMs for comparison from which VMs can be further selected for comparison. A first part 538 of the clipboard enables the user to graphically determine how many entities out of a maximum number of possible entities have been added to the clipboard, a second part 540 of the clipboard graphically displays the entities that have been added to the clipboard along with a checkbox to indicate if the entity has been selected, and a third part of the clipboard has a "compare" button 542 and a "clear all" button 544, which enable a user to display similar information related to all selected entities in the clipboard or to deselect all selected entities in the clipboard respectively. As shown in FIG. 6, the first part of the clipboard displays that a maximum of 10 entities can be added to the clipboard, of which three have already been added. The second part of the clipboard displays VM1, VM2, and VM5 as the three entities that have already been added to the clipboard and also indicates that VM1 and VM2 are selected. In an embodiment, clicking on the "compare" button in the third part displays similar information related to VM1 and VM2 in a new window and clicking on the "clear all" button deselects both VM1 and VM2. In various embodiments, the heat map view of FIG. 6 may include more or less of the elements described above.

Figure 7:
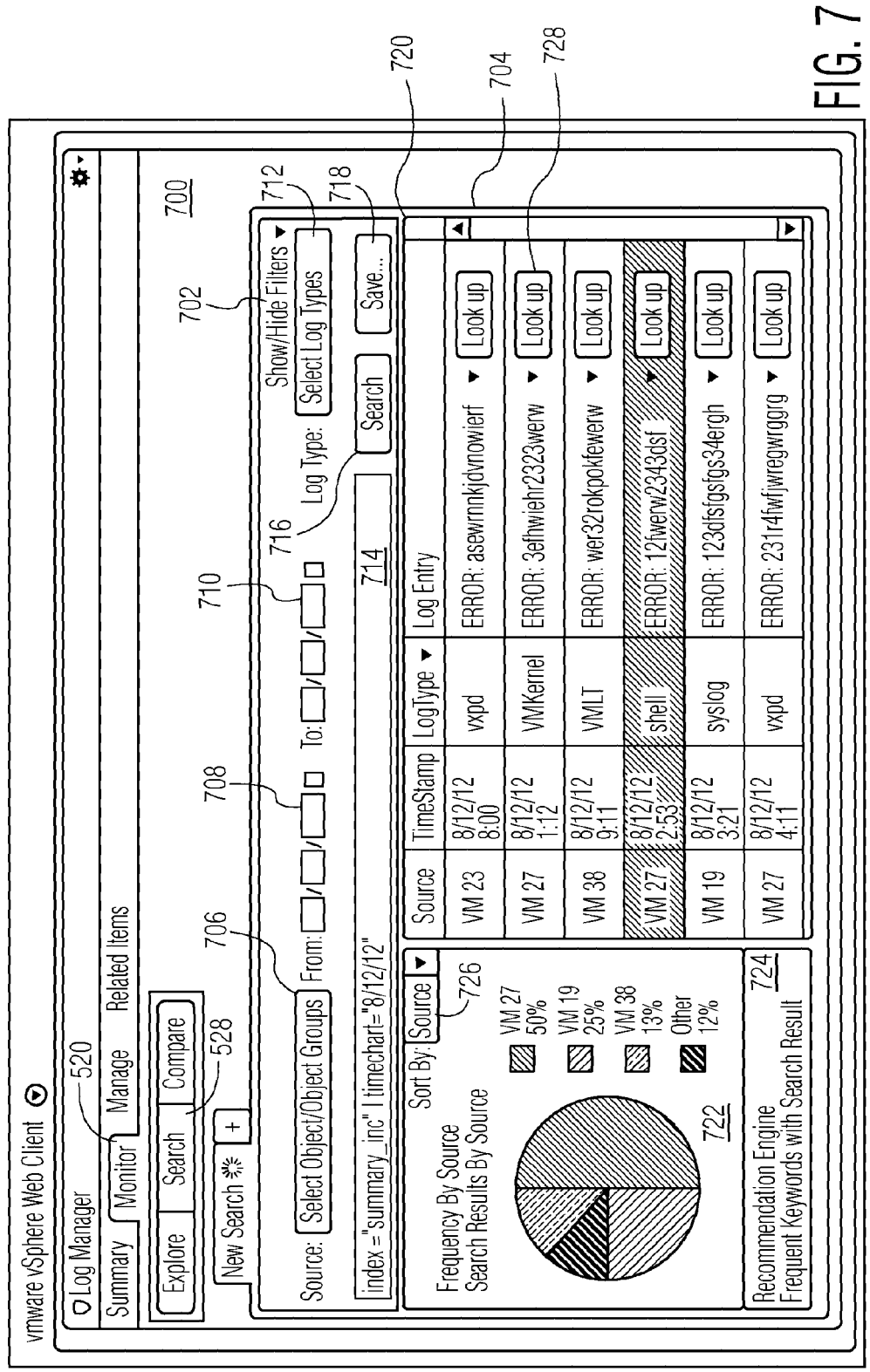
FIG. 7 is an embodiment of a graphical user interface in accordance with the invention

In an embodiment, when the monitor tab 520 and the search tab 528 are selected, a search query interface 700 for locating specific log data entries is displayed, as illustrated by the embodiment in FIG. 7. The interface initially displays a search query window 702 and, upon execution of a search query, a search result window 704. The search query window has a dropdown menu 706 that enables a user to select the object or group of objects from which log data entries are searched. Additionally, the search query window has a "From" date entry field 707 and a "To" date entry field 709 that allow a user to define the time-frame over which the log data entries are generated. A log types selection dropdown menu 712 is also provided that allows a user to select the types of logs to be searched in a manner similar to the filter window as discussed above. The search query window also includes a search string entry field 714 with a Search button 716 to execute a search using the search string and a Save button 718 to save the search string for future use without requiring a user to re-enter the string.

Once a search is executed using the entered search string, the search result window 704 is displayed. The search result window is further divided into a graphic window 722, a recommendation window 724, and a log data entries list 720. The graphic window contains a pie chart representative of the frequency of log data entries that matched the search string. The unit by which frequency is determined can be selected via a "Sort By" dropdown menu 726 that enables a user to graphically represent the frequency of log data entries, for example, per source, per time period, or per log type. The embodiment illustrated by FIG. 7 displays the frequency of log data entries generated per source where the sources are VMs.

In an embodiment, the recommendation window 724 is a text box that suggests keywords frequently used when searching for log data entries. For example, when searching for errors related to memory, the recommendation window will populate with terms related to common memory errors.

The log data entries list 720 has multiple rows divided into columns containing information related to each log data entry that is returned in response to a search executed using the search string. Each row includes a button 728 at the end of the row for displaying more information regarding the error reported in the corresponding log data entry. In the embodiment shown in FIG. 7, the log data entries include fields organized in columns for the source, the time the log data entry was created (timestamp), the type of the log data entry (LogType), and the contents of the log data entry (Log Entry). The rows in the log data entries list can be sorted on any of the columns. In FIG. 7 the log data entries list is shown as sorted by the LogType column.

Figure 8:
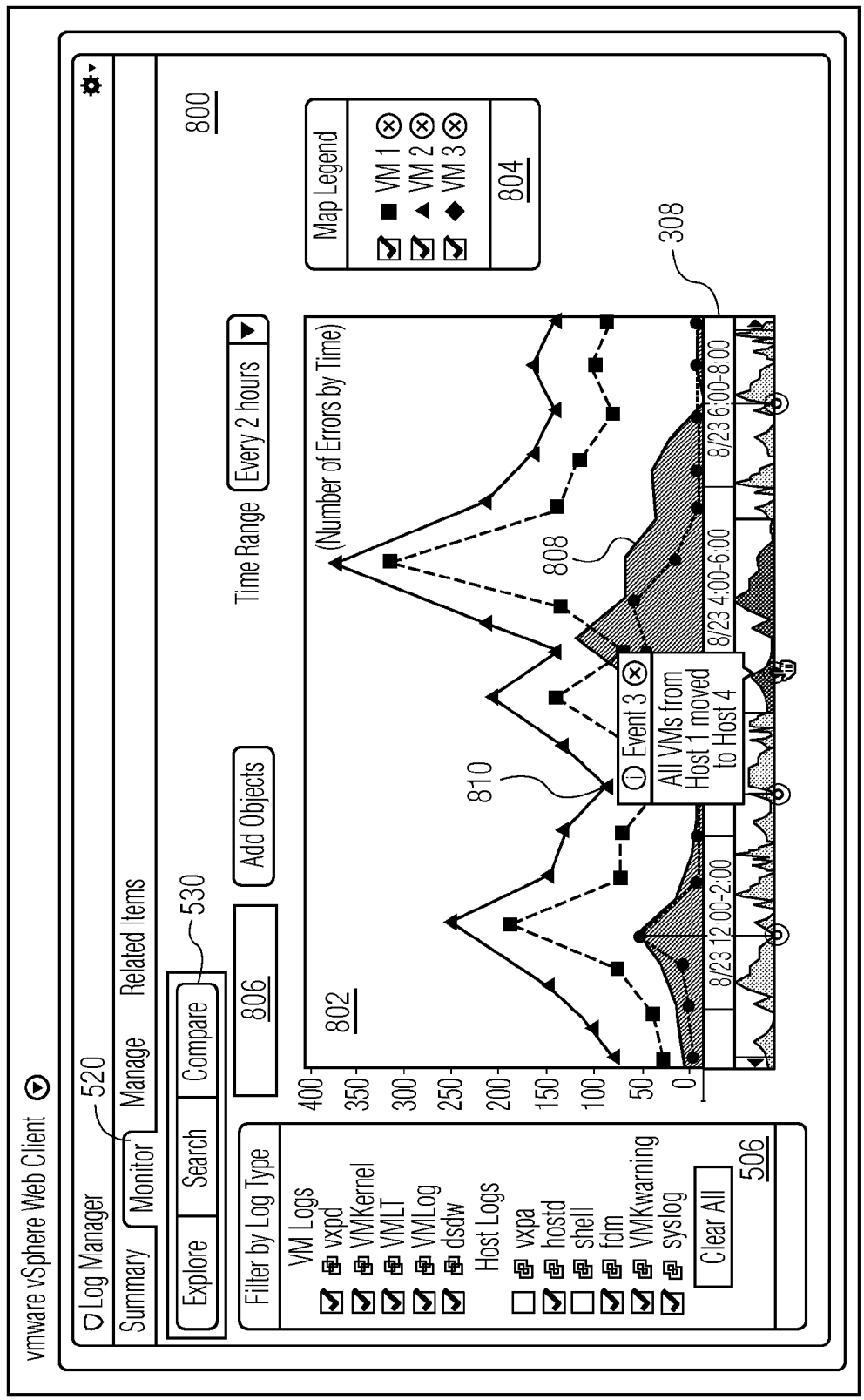
FIG. 8 is an embodiment of a graphical user interface in accordance with the invention.

When the monitor tab 520 and the compare tab 530 are selected, a graph 800 is displayed that depicts the number of errors over time per VM as they correspond to events that occurred in the virtual machine network, as illustrated by the embodiment in FIG. 8. The view initially displays a filter window 506 and a time-frame window 308, as discussed above with respect to FIGS. 5 and 6, and further includes a log data entries map 802, a map legend 804, and an Add Object field 806. The log data entries map 806 is a line graph superimposed over an area graph. The log data entries map can have multiple lines with each line representing the number of log data entries generated by an entity over a period of time. The multiple lines can be differentiated by using different colors for the line and different shapes 810 for indicating events and activities that occur. The area graph 808 displays the VM network baseline (average number of log data entries reporting errors) over the period of time. A user can cause additional information about an event or activity corresponding to a shape on a line to be displayed by selecting the period of time in the time-frame window in which the shape is located.

The map legend 804 includes entries for each of the lines in the log data entries map 802. In an embodiment, each entry indicates the color and shape corresponding to an entity included in the log data entries map. Entities can be removed from the log data entries map by clicking on an X located beside each entry in the map legend and can be added by typing the entity identifier in the Add Object field and clicking the corresponding button to add the entity to the log data entries map.

In the embodiment shown in FIG. 8, three VMs are included in the log data entries map 802. VM1 is identified by a square shape, VM 2 is identified by a triangle shape, and VM 3 is identified by a diamond shape. The area graph 808 in the background indicates the average log data entries generated by VM 1, VM 2, and VM 3 over periods of time. By selecting the period of time in the time-frame corresponding to events, additional information explaining, for example, that all VMs from Host 1 were moved to Host 4 , is displayed.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, at least portions of the disclose embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A non-transitory computer-readable storage medium comprising instructions that, when executed by a computer, enable a graphical user interface to be displayed, wherein the graphical user interface displays information related to a virtual machine network, the graphical user interface comprising:
    a circular element, the circular element being divided into slices; and
    virtual machine indicator elements located within the slices, the virtual machine indicator elements representing virtual machines;
    wherein, the slices represent groupings of virtual machines within the virtual machine network;
    wherein the slices represent hosts and wherein slices corresponding to hosts in the same cluster are adjacent to each other.

2. The non-transitory computer-readable storage medium of claim 1, wherein elements are color-coded, based on log data entries, to indicate a state of corresponding network entities.

3. The non-transitory computer-readable storage medium of claim 1, wherein the slices represent at least one of a host and a cluster.

4. The non-transitory computer-readable storage medium of claim 1, wherein virtual machine indicator elements in a slice represent virtual machines running on a host that corresponds to the slice.

5. The non-transitory computer-readable storage medium of claim 1, wherein the circular element includes dark radial lines that group multiple adjacent slices into larger slices, the larger slices representing clusters of hosts.

6. The non-transitory computer-readable storage medium of claim 1, further comprising a time-frame window that includes a timeline of the existence of virtual machine network and a frame focused on a portion of the timeline corresponding to a scope of graphically represented log data entries in the graphical user interface.

7. The non-transitory computer-readable storage medium of claim 1, wherein a scope of graphically represented log data entries in the graphical user interface is defined to include log data entries relating to a single selected cluster.

8. A computer-implemented method for displaying information related to a virtual machine network, the method comprising:
    displaying a circular element on a display device, the circular element being divided into slices; and
    displaying virtual machine indicator elements within the slices, the virtual machine indicator elements representing virtual machines;
    wherein, the slices represent groupings of virtual machines within the virtual machine network; and
    color-coding at least one of a portion of a slice and a virtual machine indicator element based on log data entries, wherein the color-coding comprises shades of color corresponding to log data entries indicating an error.

9. The computer-implemented method of claim 8 further comprising:
    displaying a source-selection window along with the circular element;
    selecting a source of log data entries via the source-selection window;
    representing graphically the log data entries from the selected source in the circular element; and
    color-coding at least one of a portion of a slice and a virtual machine indicator element based on the log data entries from the selected source.

10. The computer-implemented method of claim 8 further comprising selecting a time frame over which data is graphically represented in the circular element by dragging a frame across a timeline in a time-frame window displayed on the graphical user interface.

11. The computer-implemented method of claim 8 further comprising displaying, in space around the circular element, information related to at least one of a slice and a virtual machine indicator element when the corresponding element is selected in a first manner.

12. The computer-implemented method of claim 8 further comprising displaying, over the circular element, information related to at least one of a slice and a virtual machine indicator element when the corresponding element is selected in a second manner.

13. The computer-implemented method of claim 8 further comprising:
    displaying a filter window along with the circular element;
    selecting log types from which to receive log data entries via the filter window;
    representing graphically the log data entries from the selected log types in the circular element; and
    color-coding at least one of a portion of a slice and a virtual machine indicator element based on the log data entries from the selected log types.

14. The computer-implemented method of claim 8 further comprising selecting virtual machines for comparison.

15. A non-transitory computer-readable storage medium comprising instructions that, when executed by a computer, enable a graphical user interface to be displayed, wherein the graphical user interface displays information related to a virtual machine network, the graphical user interface comprising:
    a circular element, the circular element being divided into slices; and
    virtual machine indicator elements located within the slices, the virtual machine indicator elements representing virtual machines;
    wherein, the slices represent groupings of virtual machines within the virtual machine network;
    wherein the circular element includes dark radial lines that group multiple adjacent slices into larger slices, the larger slices representing clusters of hosts.

16. A non-transitory computer-readable storage medium comprising instructions that, when executed by a computer, enable a graphical user interface to be displayed, wherein the graphical user interface displays information related to a virtual machine network, the graphical user interface comprising:
- a circular element, the circular element being divided into slices;
- virtual machine indicator elements located within the slices, the virtual machine indicator elements representing virtual machines;
- wherein, the slices represent groupings of virtual machines within the virtual machine network; and
- a time-frame window that includes a timeline of the existence of virtual machine network and a frame focused on a portion of the timeline corresponding to a scope of graphically represented log data entries in the graphical user interface.

17. A non-transitory computer-readable storage medium comprising instructions that, when executed by a computer, enable a graphical user interface to be displayed, wherein the graphical user interface displays information related to a virtual machine network, the graphical user interface comprising:
- a circular element, the circular element being divided into slices; and
- virtual machine indicator elements located within the slices, the virtual machine indicator elements representing virtual machines;
- wherein, the slices represent groupings of virtual machines within the virtual machine network; and
- wherein a scope of graphically represented log data entries in the graphical user interface is defined to include log data entries relating to a single selected cluster.

18. A computer-implemented method for displaying information related to a virtual machine network, the method comprising:
- displaying a circular element on a display device, the circular element being divided into slices;
- displaying virtual machine indicator elements within the slices, the virtual machine indicator elements representing virtual machines;
- wherein, the slices represent groupings of virtual machines within the virtual machine network
- displaying a source-selection window along with the circular element;
- selecting a source of log data entries via the source-selection window;
- representing graphically the log data entries from the selected source in the circular element; and
- color-coding at least one of a portion of a slice and a virtual machine indicator element based on the log data entries from the selected source.

19. A computer-implemented method for displaying information related to a virtual machine network, the method comprising:
- displaying a circular element on a display device, the circular element being divided into slices;
- displaying virtual machine indicator elements within the slices, the virtual machine indicator elements representing virtual machines;
- wherein, the slices represent groupings of virtual machines within the virtual machine network; and
- selecting a time frame over which data is graphically represented in the circular element by dragging a frame across a timeline in a time-frame window displayed on the graphical user interface.

20. A computer-implemented method for displaying information related to a virtual machine network, the method comprising:
- displaying a circular element on a display device, the circular element being divided into slices;
- displaying virtual machine indicator elements within the slices, the virtual machine indicator elements representing virtual machines;
- wherein, the slices represent groupings of virtual machines within the virtual machine network; and
- displaying, in space around the circular element, information related to at least one of a slice and a virtual machine indicator element when the corresponding element is selected in a first manner.

21. A computer-implemented method for displaying information related to a virtual machine network, the method comprising:
- displaying a circular element on a display device, the circular element being divided into slices;
- displaying virtual machine indicator elements within the slices, the virtual machine indicator elements representing virtual machines;
- wherein, the slices represent groupings of virtual machines within the virtual machine network; and
- displaying, over the circular element, information related to at least one of a slice and a virtual machine indicator element when the corresponding element is selected in a second manner.

* * * * *